US007889945B2

(12) United States Patent
Lyuboshenko

(10) Patent No.: US 7,889,945 B2
(45) Date of Patent: Feb. 15, 2011

(54) METHOD FOR OBTAINING A PHASE IMAGE FROM AN INTENSITY IMAGE

(76) Inventor: Igor Lyuboshenko, 1 rue Bagno A. Ripoli, F-92350 Le Plessis-Robinson (FR)

( * ) Notice: Subject to any disclaimer, the term of this patent is extended or adjusted under 35 U.S.C. 154(b) by 827 days.

(21) Appl. No.: 11/883,604

(22) PCT Filed: Feb. 3, 2006

(86) PCT No.: PCT/FR2006/000254

§ 371 (c)(1),
(2), (4) Date: Sep. 10, 2007

(87) PCT Pub. No.: WO2006/082327

PCT Pub. Date: Aug. 10, 2006

(65) Prior Publication Data

US 2008/0159642 A1 Jul. 3, 2008

(30) Foreign Application Priority Data

Feb. 3, 2005 (FR) .................................. 05 01082

(51) Int. Cl.
*G06K 9/36* (2006.01)
*G06K 9/64* (2006.01)
(52) U.S. Cl. ...................................... 382/276; 382/280
(58) Field of Classification Search ......... 382/260–265, 382/276, 279, 280
See application file for complete search history.

(56) References Cited

U.S. PATENT DOCUMENTS 7,298,908 B2 * 11/2007 Lewis et al. .................. 382/211
2004/0037462 A1 * 2/2004 Lewis et al. .................. 382/181

FOREIGN PATENT DOCUMENTS

WO WO 00/26622 5/2000

OTHER PUBLICATIONS

Lyuboshenko et al., "Phase unwrapping for interferometric synthetic aperture radar by use of Helmholtz equation eigenfunctiions and the first Green's identity", *Journal of the Optical Society of America A (Optics, Image Science and Vision)*, Opt. Soc. America USA vol. 16. No. 2 Feb. 1999, pp. 378-395, XP002347238 ISSN: 0740-3232.

\* cited by examiner

*Primary Examiner*—Brian Q Le
(74) *Attorney, Agent, or Firm*—DLA Piper LLP (US)

(57) ABSTRACT

A method of reconstructing a phase of a radiation wave field including determining a representative measure of an intensity variation of the radiation wave field on a selected surface extending globally from one end to another of the radiation wave field, determining a representative measure of the intensity of the radiation wave field on the selected surface, transforming the representative measure of the intensity variation to produce a first representation of integral transform and to apply to the first representation of integral transform a first filter and producing a first representation of modified integral transform, applying a first function of the first representation of integral transform to the first representation of modified integral transform and producing an untransformed representation, applying a correction based on the measure of intensity on the selected surface to the untransformed representation, transforming the untransformed corrected representation to produce a second representation of integral transform and applying a second filter to the second representation of integral transform, and applying a second function of the second integral transform to the second modified representation of integral transform to produce a measure of phase of the radiation wave field on the selected surface extending globally from one end to another of the radiation wave field, wherein the first and second filters are measures of a representation of a Green's function in a space of eigenfunctions of the Helmholtz equation with separable coordinates such that the first and second integral transforms are one-dimensional integral transforms in the space of the radiation wave field.

12 Claims, 11 Drawing Sheets

METHOD FOR OBTAINING A PHASE IMAGE FROM AN INTENSITY IMAGE

RELATED APPLICATION

This is a §371 of International Application No. PCT/FR2006/000254, with an international filing date of Feb. 3, 2006 (WO 2006/082327 A1, published Aug. 10, 2006), which is based on French Patent Application No. 05/01082, filed Feb. 3, 2005.

TECHNICAL FIELD

This disclosure relates to the field of image processing, more specifically, to the process of obtaining an image of phase from an image of intensity.

BACKGROUND

The problem of obtaining an image of phase from an image of intensity has been considered during the last twenty years. In <<Relationship between two-dimensional intensity and phase in Fresnel Diffraction zone>>, Abramoshkin et al. (1989) provide the value of the phase gradient from intensity, the intensity gradient and Green's functions in an infinite space.

More precisely, Fornaro et al. discloses in <(<Interferometric SAR phase unwrapping Using Green's Formulation>> using the Fast Fourier Transforms for computing the phase from phase gradient by using Green's functions.

The formulation using the Fourier Transform is used in WO 00/26622, which describes the process of obtaining such a phase image. That process concerns the retrieval of phase of a radiation wave field by solving the equation of the energy transfer. The rate of variation of the intensity of the image is determined first, orthogonally with respect to the surface that spans the wave field (i.e., when measuring the intensity in the two separate surfaces). This rate is then subject to the following computation process: defining an integral transform, multiplication by a filter corresponding to the inversion of the differential operator, and defining the inverse integral transform. The result is multiplied by the function of intensity with respect to the surface. The filters have the form based on the characteristics of the optical system used for acquiring the intensity data, such as the numerical aperture and spatial frequencies.

More specifically, the Fourier transform is the Fourier transform in two dimensions.

However, one of the major problems in the field of image processing is the computation time for applications involving solution of the equations characteristic to the image.

Thus, the computation times are not sufficient to perform the computations for a large number of images.

Further, it should be noted that WO '622 does not mention the boundary conditions, by supposing that the phase is zero at infinity.

SUMMARY

I provide a process of retrieval of phase of the radiation wave field comprising the following steps:
compute a representative measure of the intensity variation of the radiation wave field on a selected surface extending globally from one end to another of the radiation wave field;
compute a representative measure of the intensity of the radiation wave field on the selected surface;
transform the representative measure of the intensity variation to produce a first representation of integral transform and to apply to the first representation of integral transform a first filter to produce a first representation of modified integral transform;
apply a first function of the first representation of integral transform to the first representation of modified integral transform to produce an untransformed representation;
apply a correction based on the measure of intensity on the selected surface to the untransformed representation;
transform the untransformed corrected representation to produce a second representation of integral transform and to apply to the second representation of integral transform a second filter;
apply a second function of the second integral transform to the second modified representation of integral transform to produce a measure of phase of the radiation wave field on the selected surface extending globally from one end to another of the radiation wave field,
wherein the first and second filters are measures of a representation of a Green's function in a space of eigenfunctions of the Helmholtz equation with separable coordinates such that the first and second integral transforms are one-dimensional integral transforms in the space of the radiation wave field.

The first function may use a trigonometric function of the cosine type, and the second function uses a trigonometric function of the sine type.

By the same token, it is possible that the first function uses a trigonometric function of the sine type, and the second function uses a trigonometric function of the cosine type.

As an advantage, the first and second integral transforms are produced by using a Fourier transform, for example, a fast transform. According to one alternative, the first and second filters are sensibly the same. The surfaces may be sensibly planar.

I also provide a computer program, possibly saved on a support, to execute the different steps of the process.

I further provide an apparatus of reconstruction of phase of a radiation wave field comprising:
a means for acquisition of a representative measure of the intensity variation of the radiation wave field on a selected surface extending globally from one end to another of the radiation wave field;
a means for acquisition of a representative measure of the intensity of the radiation wave field on the said selected surface;
a processing means to sequentially perform the following steps:
  (i) transform the representative measure of the intensity variation to produce a first representation of integral transform and to apply to the first representation of integral transform a first filter to produce a first representation of modified integral transform;
  (ii) apply a first function of the first representation of integral transform to the first representation of modified integral transform to produce an untransformed representation;
  (iii) apply a correction based on the measure of intensity on the selected surface to the untransformed representation;
  (iv) transform the untransformed corrected representation to produce a second representation of integral transform and to apply to the second representation of integral transform a second filter;
  (v) apply a second function of the second integral transform to the second modified representation of integral transform to produce a measure of phase of the radiation wave field on the selected surface extending globally from one end to another of the radiation wave field, wherein the first and second filters are measures of a representation of a Green's function in a space of eigenfunctions of the Helmholtz equation with separable coordinates such that the first and second integral transforms are one-dimensional integral transforms in the space of the radiation wave field.

The means of acquisition of a representative measure of the intensity variation of the radiation wave field may comprise at least one mobile platform. The means of acquisition of a representative measure of the intensity variation of the radiation wave field may also comprise at least a lens with a variable length of focus.

BRIEF DESCRIPTION OF THE DRAWINGS

My disclosure is better understood due to the description made hereafter for purely explanatory purposes of a representative example, with reference to the annexed figures where.

My disclosure is described in detail below in the Cartesian coordinate system and with a rectangular image. It is understood that one skilled in the art is capable, in reading this description, to adapt the information contained herein for the other types of images and/or the other types of coordinates.

DETAILED DESCRIPTION

I provide a method of reconstruction of the function $\phi(\vec{r})$ of phase in a point $\vec{r}=(x, y)$ of a 2D plane from samples of the first-order differences in points $(x, y)=(n\Delta x, m\Delta y)$. We compute the phase only in the points for which $x=n\Delta x$ and $y=m\Delta y$, where the lines of the two-dimensional (2D) grid intersect, i.e., in the centers of points where elements (pixels) of a two-dimensional sensor of the luminous energy are situated, for example, of a CCD camera. The phase differences of the first order in the points $(x, y)=(n\Delta x, m\Delta y)$ are obtained by computation of the gradient of the phase from the derivative of the intensity $\partial I/\partial z$ along the optical axis z. This computation is detailed later. To facilitate the transition from the discrete notation to the continuous notation, the description of terms used in the description of the process is presented in the Table I.

Figure 1:
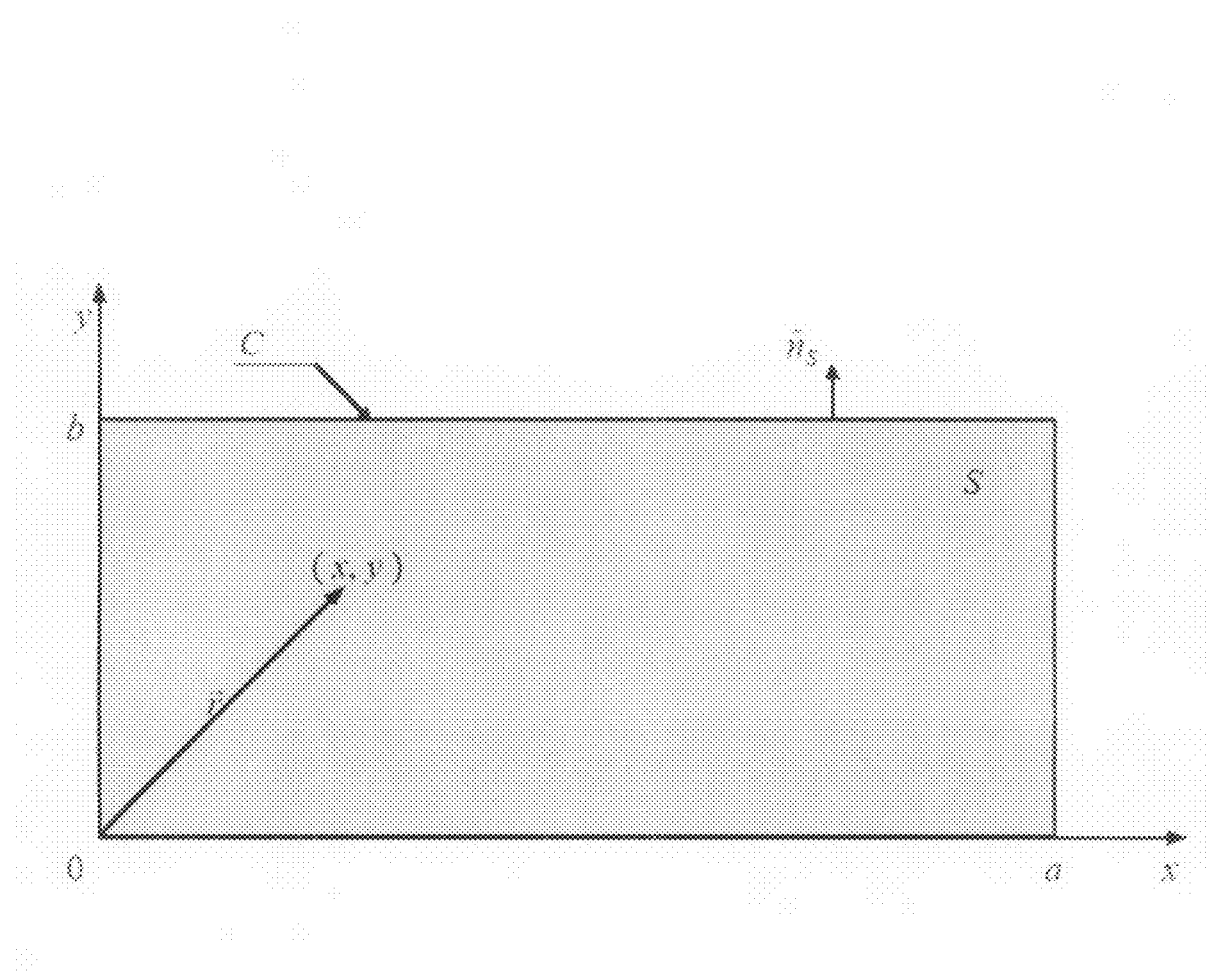
FIG. 1 represents image data.

Fornaro et al. used the first Green's identity for evaluation of the phase from the differences of the first order presented in the continuous form as a gradient vector $F(\vec{r})$. The phase is computed as a sum of the integral over the support region S of the image of phase and over the boundary C of this region:

$$\phi(\vec{r}')=\int_S F(\vec{r})\cdot\nabla g(\vec{r},\vec{r}')d\vec{r}-\oint_C \phi(\vec{r})[\hat{n}_S\cdot\nabla g(\vec{r},\vec{r}')]d\vec{c} \quad \text{Equation 1}$$

where $\hat{n}_S$ is a unity vector perpendicular to C and oriented exterior to S as shown in FIG. 1, and where $g(\vec{r},\vec{r}')$ is a Green's function. In Equation 1, the phase $\phi$ enters both in the left-hand side and in the integral on the contour C. This double introduction of the same value in the two parts of Equation 1 does not obtain the phase if it is not zero or known a priori on the contour C.

Therefore, the integration of the phase on the contour C means that the phase should either be known, be equal to zero, or be pre-calculated by another optical device, for example, the Shack-Hartmann arrangement of lenses, prior to reconstructing the phase inside the surface S. The integration on the contour in Equation 1 can also be eliminated if the chosen Green's function satisfies the Neumann boundary conditions on the contour C of the surface S:

$$\hat{n}_S\cdot\nabla g(\vec{r},\vec{r}')=0 \quad \text{Equation 2}$$

Equation 2 is valid for the Green's function, and therefore the phase reconstructed according to the Equation 1 satisfies Neumann boundary conditions. The integration on the contour C can also be eliminated if the chosen Green's function satisfies, on the contour C, Dirichlet boundary conditions and if it is known that the phase is zero on C, that is written as:

$$g(\vec{r},\vec{r}')=0, \vec{r}\in C, \vec{r}'\in S$$

$$\phi(\vec{r})=0, \vec{r}\in C. \quad \text{Equation 3}$$

As previously, Equation 3 is valid for the Green's function and for the phase on the contour C, therefore the phase computed according to (1) using the Green's function from Equation 3 satisfies Dirichlet boundary conditions.

Further, it is known that the Green's function satisfies the equation:

$$\nabla^2 g(\vec{r},\vec{r}')=-\delta(\vec{r},\vec{r}') \quad \text{Equation 4}$$

where $\delta(\vec{r},\vec{r}')$ is the Dirac function.

To satisfy preceding equations, a Green's function may be chosen to be expressed in the form of a series in eigenfunctions of the Helmholtz equation as follows. One skilled in the art will note that it automatically satisfies the boundary conditions (2) or (3) according to the chosen form, and also the identity (4).

For a rectangular support region S, these special functions are:

$$U_{m,n}(\vec{r})=A_{m,n}\cos(\xi_n x)\cos(\eta_m y), m,n=0,\ldots,\infty \quad \text{Equation 5}$$

for the Neumann boundary conditions, and $$U_{m,n}(\vec{r})=A_{m,n}\sin(\xi_n x)\sin(\eta_m y), m,n=0,\ldots,\infty \quad \text{Equation 6}$$

for the Dirichlet boundary conditions.

For a support S of dimensions a×b, the constant $A_{m,n}$ in 5 and 6 is equal to $\sqrt{2}a^{-1/2}b^{-1/2}$ if m or n are zero and $2a^{-1/2}b^{-1/2}$ otherwise, where a is the length, b is the height of the rectangular region of support S as in FIG. 1.

The eigenvalues associated with the functions (5) and (6) are also used, which are:

$$\sigma_{m,n}^2=\xi_n^2+\eta_m^2, \xi_n=\frac{n\pi}{a}, \eta_m=\frac{m\pi}{b}, m,n=0,\ldots,\infty. \quad \text{Equation 7}$$

The Green's function for the domain S is written as an infinite series in eigenfunctions of the Helmholtz equation:

$$g(\vec{r}, \vec{r}') = \sum_{m,n=0, \sigma_{m,n}^2 \neq 0}^{\infty} \sigma_{m,n}^{-2} U_{m,n}(\vec{r}) U_{m,n}(\vec{r}').$$

Equation 8

The derivation of the general expression (8) and the verification of the boundary conditions (2) and (3) are readily realizable by one skilled in the art for such a function.

Thus, if the Green's function (8) is used as $g(\vec{r}, \vec{r}')$ in the Equation 1, the integration on the contour in the Equation 1 can be suppressed and the phase can be expressed in the compact form:

$$\phi(\vec{r}') = \int_S F(\vec{r}) \cdot \nabla g(\vec{r}, \vec{r}') dS$$

Equation 9 in which it is noted that the gradient is computed with respect to the variable $\vec{r}$, that is $\nabla = \nabla_{\vec{r}}$.

One aspect is to compute numerically the Equation 9 using the defined Green's functions to obtain the required phase, in preserving the acceptable computation time. The solution is obtained by the possibility to use a one-dimensional Fast Fourier Transform (1DFFT).

The use of this transform in one dimension is not straightforward for one skilled in the art taking into consideration general equations above. I provide below the various steps for comprehension of the fact that it is possible to use such a transform in one dimension.

Several preliminary transformations are necessary. To facilitate calculations, I point out various intermediate stages of calculation which should not be regarded as essential components, but simply the means of obtaining a form of equation with which it is possible to implement the transforms in an adequate dimension.

For more clarity, the Neumann boundary conditions are considered first, with $\gamma = a/b$ and the Green's function in the expression of the Equation 8 with special functions (5):

$$g(\vec{r}, \vec{r}') = \sum_{m=0, m^2+n^2 \neq 0}^{\infty} A_{m,n}^2 \cos(\eta_m y) \cos(\eta_m y') \times$$

$$\sum_{n=0}^{\infty} \frac{\cos(\xi_n x) \cos(\xi_n x')}{(\pi/a)n^2 + (\pi/b)m^2}.$$

Equation 10

The cases n=0, m≠0 and n≠0, m=0 are separated to obtain:

$$g(\vec{r}, \vec{r}') = 2\pi^{-2} \gamma \sum_{n=1}^{\infty} n^{-2} \cos(\xi_n x) \cos(\xi_n x') +$$

$$2\pi^{-2} \gamma^{-1} \sum_{m=1}^{\infty} m^{-2} \cos(\eta_m y) \cos(\eta_m y') +$$

$$4a^{-1} b^{-1} \sum_{m=1}^{\infty} \cos(\eta_m y) \cos(\eta_m y') \sum_{n=1}^{\infty} \frac{\cos(\xi_n x) \cos(\xi_n x')}{(n/a)^2 + (m/b)^2}.$$

Equation 11

However, it is known that:

$$\sum_{n=1}^{\infty} \frac{\cos(nu)}{n^2 + \alpha^2} = \frac{\pi}{2\alpha} \frac{\cosh[\alpha(\pi - u)]}{\sinh(\alpha \pi)} - \frac{1}{2\alpha^2},$$

$$0 \leq u \leq 2\pi,$$

Equation 12

Therefore, $$a^{-1} b^{-1} \sum_{n=1}^{\infty} \frac{\cos(\xi_n x) \cos(\xi_n x')}{(n/a)^2 + (m/b)^2} = \frac{\pi}{2m} f_m^\gamma(x, x') - \frac{1}{2\gamma m^2},$$

$$m \neq 0,$$

Equation 13 with $$f_m^\gamma(x, x') =$$

$$\frac{1}{\sinh(\gamma m \pi)} \begin{cases} \cosh[\eta_m(a-x)]\cosh(\eta_m x'), & \text{if } x > x' \\ \cosh[\eta_m(a-x')]\cosh(\eta_m x), & \text{if } x < x'. \end{cases}$$

Equation 14

However, $$\sum_{n=1}^{\infty} n^{-2} \cos(nu) \cos(nv) =$$

$$\frac{1}{12} \begin{cases} 3u^2 + 3(v-\pi)^2 - \pi^2, & \text{if } 0 \leq u \leq v \\ 3v^2 + 3(u-\pi)^2 - \pi^2, & \text{if } 0 \leq u \leq v. \end{cases}$$

Equation 15

Therefore, the Green's function is given according to this aspect by:

$$g(\vec{r}, \vec{r}') = 2\pi^{-1} \sum_{m=1}^{\infty} m^{-1} \cos(\eta_m y) \cos(\eta_m y') f_m^\gamma(x, x') +$$

$$\frac{\gamma}{6a^2} \begin{cases} 3x^2 + 3(x'-a)^2 - a^2, & \text{if } x \leq x' \\ 3(x')^2 + 3(x-a)^2 - a^2, & \text{if } x' < x. \end{cases}$$

Equation 16

However, it is also known that:

$$g(\vec{r}, \vec{r}') = 2\pi^{-1} \sum_{m=1}^{\infty} n^{-1} \cos(\xi_n x) \cos(\xi_n x') f_m^{\bar{\gamma}}(y, y') +$$

$$\frac{\bar{\gamma}}{6b^2} \begin{cases} 3y^2 + 3(y'-b)^2 - b^2, & \text{if } y \leq y' \\ 3(y')^2 + 3(y-b)^2 - b^2, & \text{if } y' < y, \end{cases}$$

Equation 17 where $\bar{\gamma} = \gamma^{-1}$ with:

$$f_n^{\bar{\gamma}}(y, y') =$$

$$\frac{1}{\sinh(\bar{\gamma} n \pi)} \begin{cases} \cosh[\xi_n(b-y)]\cosh(\xi_n y'), & \text{if } y > y' \\ \cosh[\xi_n(b-y')]\cosh(\xi_n y), & \text{if } y < y'. \end{cases}$$

Equation 18

By taking the derivatives of these expressions of the Green's function with respect to x and y, it follows that:

$$g_y(\vec{r}, \vec{r}') = -2b^{-1} \sum_{m=1}^{\infty} \sin(\eta_m y) \cos(\eta_m y') f_m^\gamma(x, x')$$

Equation 19 and $$g_x(\vec{r}, \vec{r}') = -2a^{-1} \sum_{n=1}^{\infty} \sin(\xi_n x) \cos(\xi_n x') f_n^{\bar{\gamma}}(y, y')$$

Equation 20 and in inserting equation (9) it follows that:

$$\phi(x', y') = 2b^{-1} \sum_{m=1}^{M'-1} \cos(\eta_m y') \int_0^a f_m^\gamma(x, x') D_x(\eta_m) dx + \quad \text{Equation 21}$$
$$2a^{-1} \sum_{n=1}^{N'-1} \cos(\xi_n x') \int_0^b f_n^\gamma(y, y') D_y(\xi_n) dy$$

where M' and N' are integers. They can be chosen to attain the required numerical precision. In particular, I choose these two numbers as powers of two, greater than M+1 and N+1, respectively, where M and N represent the dimensions of the image to process.

Due to the presence of the factors $\sin(\eta_m y)$ and $\sin(\xi_n x)$ in equations (19) and (20), the integration [with respect to y in the first sum of the right-hand side of Equation 21 to obtain $D_x(\eta_m)$ and with respect to x in the second sum of the right-hand side to obtain $D_y(\xi_n)$] allows one to compute the sequences $D_x(\eta_m)$ and $D_y(\xi_n)$ as the imaginary parts (taken with the negative sign) of the Fourier Transform (FT) of the derivatives (with respect to y and with respect to x, respectively) of the phase.

These two sequences can be computed numerically by using the algorithm of the Discrete Fourier Transform, by algorithm of the Fast Fourier Transform (1DFFT or FFT 1D), as applied to the phase differences of the first order $F_y$ and $F_x$ respectively:

$$D_x(\eta_m) = -\Im\{FFT[F_y(n,m), n=\text{const}]\}_{\eta_m} \quad \text{Equation 22}$$

$$D_y(\xi_n) = -\Im\{FFT[F_x(n,m), m=\text{const}]\}_{\xi_n} \quad \text{Equation 23}$$

It is noted that n=const means that the first index (i.e., n) is fixed in $F_y(n, m)$ whereas the FFT 1D of the resultant sequence, in which the second index (i.e., m) varies, is computed. Inversely, m=const means that the second index (i.e., m) is fixed in $F_x(n, m)$ whereas the FFT 1D of the resultant sequence, in which the first index (i.e., n) varies, is computed. The indices $\eta_m$ and $\xi_n$ indicate the discrete frequencies for which the 1D FFT should be evaluated.

In addition, taking into consideration calculation above, in case of Dirichlet boundary conditions, the phase is given in the same way by:

$$\phi(x', y') = 2b^{-1} \sum_{m=1}^{M'-1} \sin(\eta_m y') \int_0^a f_m^\gamma(x, x') D_x(\eta_m) dx + \quad \text{Equation 24}$$
$$2a^{-1} \sum_{n=1}^{N'-1} \sin(\xi_n x') \int_0^b f_n^\gamma(y, y') D_y(\xi_n) dy$$

with the real parts of the Fourier transforms in one dimension:

$$D_x(\eta_m) = \Re\{FFT[F_y(n,m), n=\text{const}]\}_{\eta_m}$$

$$D_y(\xi_n) = \Re\{FFT[F_x(n,m), m=\text{const}]\}_{\xi_n}. \quad \text{Equation 25}$$

Computation From The Intensity

Again with reference to Abramoshkin et al., the gradient of the phase from the Green's function is known:

$$\nabla \phi(\vec{r}') = \int_S \frac{\partial I(\vec{r})}{\partial z} \nabla g(\vec{r}, \vec{r}') d\vec{r}, \quad \text{Equation 26}$$

where the Green's function used is the Green's function for the infinite space:

$$g(\vec{r}, \vec{r}') = -\frac{1}{2\pi} \ln|\vec{r} - \vec{r}'|. \quad \text{Equation 27}$$

Therefore, by re-using Equation 1, $$\phi(\vec{r}') = \quad \text{Equation 28}$$
$$-k \int_S [I(\vec{r}; z)]^{-1} \left\{ \int_S \frac{\partial I(\vec{r}'')}{\partial z} \nabla g(\vec{r}'', \vec{r}) d\vec{r}'' \right\} \cdot \nabla g(\vec{r}, \vec{r}') d\vec{r} +$$
$$\oint_C \phi(\vec{r})[\hat{n}_S \cdot \nabla g(\vec{r}, \vec{r}')] d\vec{c}.$$

By using the Green's function (that cancel the second integral on the contour), it follows that:

$$\phi(\vec{r}') = \quad \text{Equation 29}$$
$$-k \int_S [I(\vec{r}; z)]^{-1} \left\{ \int_S \frac{\partial I(\vec{r}'')}{\partial z} \nabla g(\vec{r}'', \vec{r}) d\vec{r}'' \right\} \cdot \nabla g(\vec{r}, \vec{r}') d\vec{r}$$

with, for Neumann conditions:

$$\phi_{y'}(x', y') = 2b^{-1} \sum_{m=1}^{M'-1} \cos(\eta_m y') \int_0^a f_m^\gamma(x, x') P_x(\eta_m) dx, \quad \text{Equation 30}$$

$$\phi_{x'}(x', y') = 2a^{-1} \sum_{n=1}^{N'-1} \cos(\xi_n x') \int_0^b f_m^\gamma(y, y') P_y(\xi_n) dy,$$

with $$P_x(\eta_m) = -\Im\left\{FFT\left[\frac{\partial I}{\partial z}(n, m), n = \text{const}\right]\right\}_{\eta_m} \quad \text{Equation 31}$$

$$P_y(\xi_n) = -\Im\left\{FFT\left[\frac{\partial I}{\partial z}(n, m), m = \text{const}\right]\right\}_{\xi_n}.$$

One also obtains the equivalent functions for the Dirichlet boundary conditions.

Equation 28 is substantially that used in WO '622. In WO '662, the second term is cancelled by supposing that the phase is zero on the contour, whereas my phase can be nonzero. The calculation is nevertheless realizable by Neummann and Dirichlet boundary conditions cancelling this term. In addition, in WO '622, Equation 28 is expressed in the Fourier domain and calculated by Fourier transforms of Fourier in two dimensions. On the contrary, I carry out this calculation of phase by using the Fourier transforms in one dimension thanks to the use of specific Green's functions which substantially decreases the number of complex operations, and thus the computing time of the algorithms associated with my method.

Figure 2:
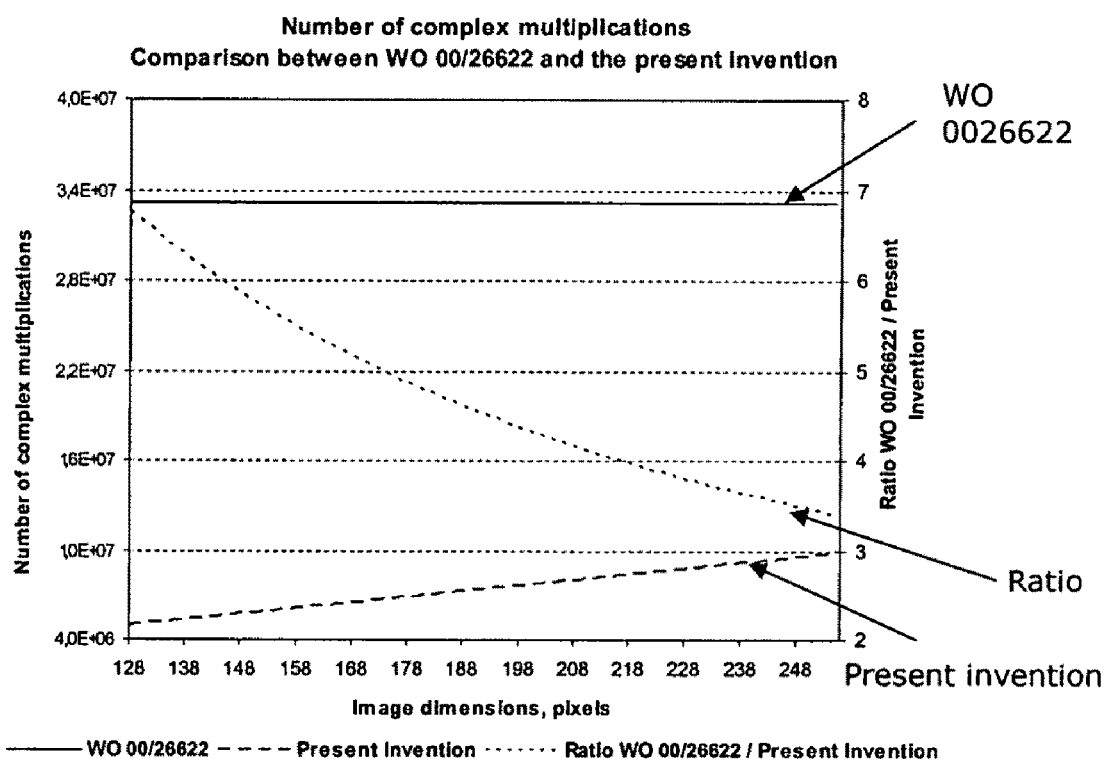
FIG. 2 shows a comparison between the number of complex multiplications in my methods and in WO 00/26622 for a processed image with dimensions from 64×64 pixels to 128×128 pixels.
Figure 3:
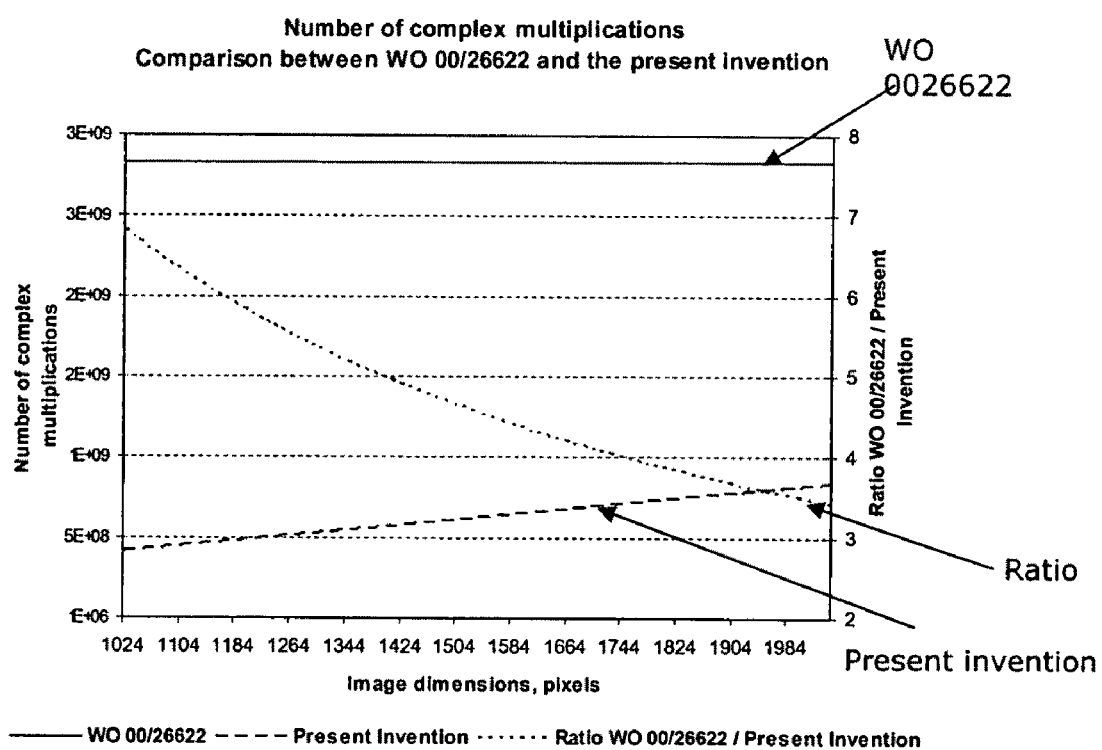
FIG. 3 shows a comparison between the number of complex multiplications in my methods and in WO 00/26622 for a processed image with dimensions from 1024×1024 pixels to 2047×2047 pixels.

As illustrated in FIGS. 2 and 3, the number of complex multiplications is calculated between my solution by the 1D Fourier transform, and the solution of WO '622 depending on the size of the processed image. It is clear that my solution saves considerably the image processing time for the phase reconstruction.

Processing Algorithm for Phase Reconstruction

I now provide an example. For this, the following notations are used:

Abbreviations:
BC—Boundary Conditions;
1D FFT—One-dimensional direct Fourier Transform;
1D IFFT—One-dimensional inverse Fourier Transform;
$\Re[\ldots]$—Real part of the complex number in brackets;
$\Im[\ldots]$—Imaginary part of the complex number in brackets.

The following parameters of the initial images:
M×N, where M is the number of rows in the image, indexed by $i=1, \ldots, M$; and N is the number of columns, indexed by $j=1, \ldots, N$.

Constants:
$a=N'=2^i \geq N+1$;
$b=M'=2^j \geq M+1$;
$H_{max}=225$ (for the 32-bit computer);
$\gamma=a/b$, $\Delta v_y=\pi/b$, $M_{max}=\min\{M', H_{max}/\gamma\}$;
$\beta=b/a$, $\Delta v_x=\pi/a$, $N_{max}=\min\{N', H_{max}/\beta\}$.

Figure 4:
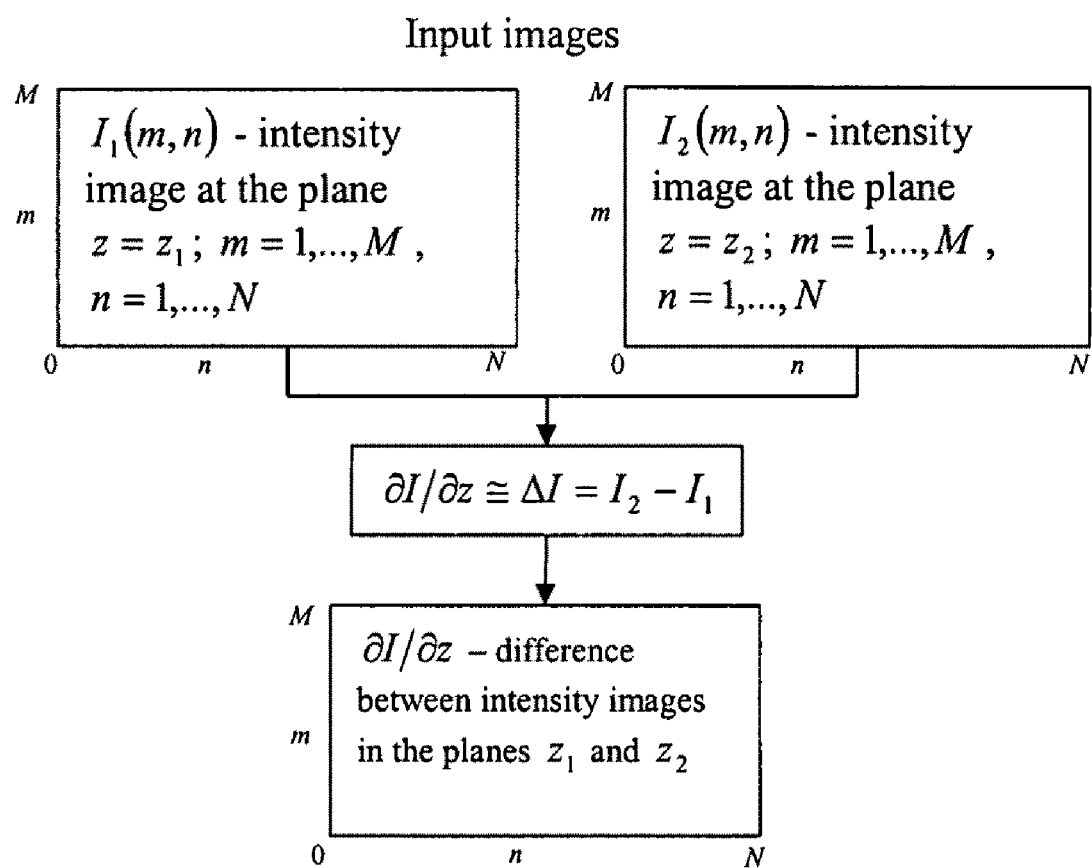
FIG. 4 shows the data from initial images at the start of the algorithm.

FIG. 4 shows the first step of the algorithm in which, from an image, one computes $\partial I/\partial z$ by difference between intensity images in the planes $z_1$ and $z_2$. This difference is of course computed pixel by pixel in the images $I_2(m, n)$ and $I_1(m, n)$. It will be understood that, in case of arbitrary coordinates, this measure of $\partial I/\partial z$ corresponds in fact to any measure of the intensity variation over a surface.

In a general way, the algorithm gives the possibility, each time when this is necessary, of choosing between Neumann and Dirichlet boundary conditions.

Figure 5A:
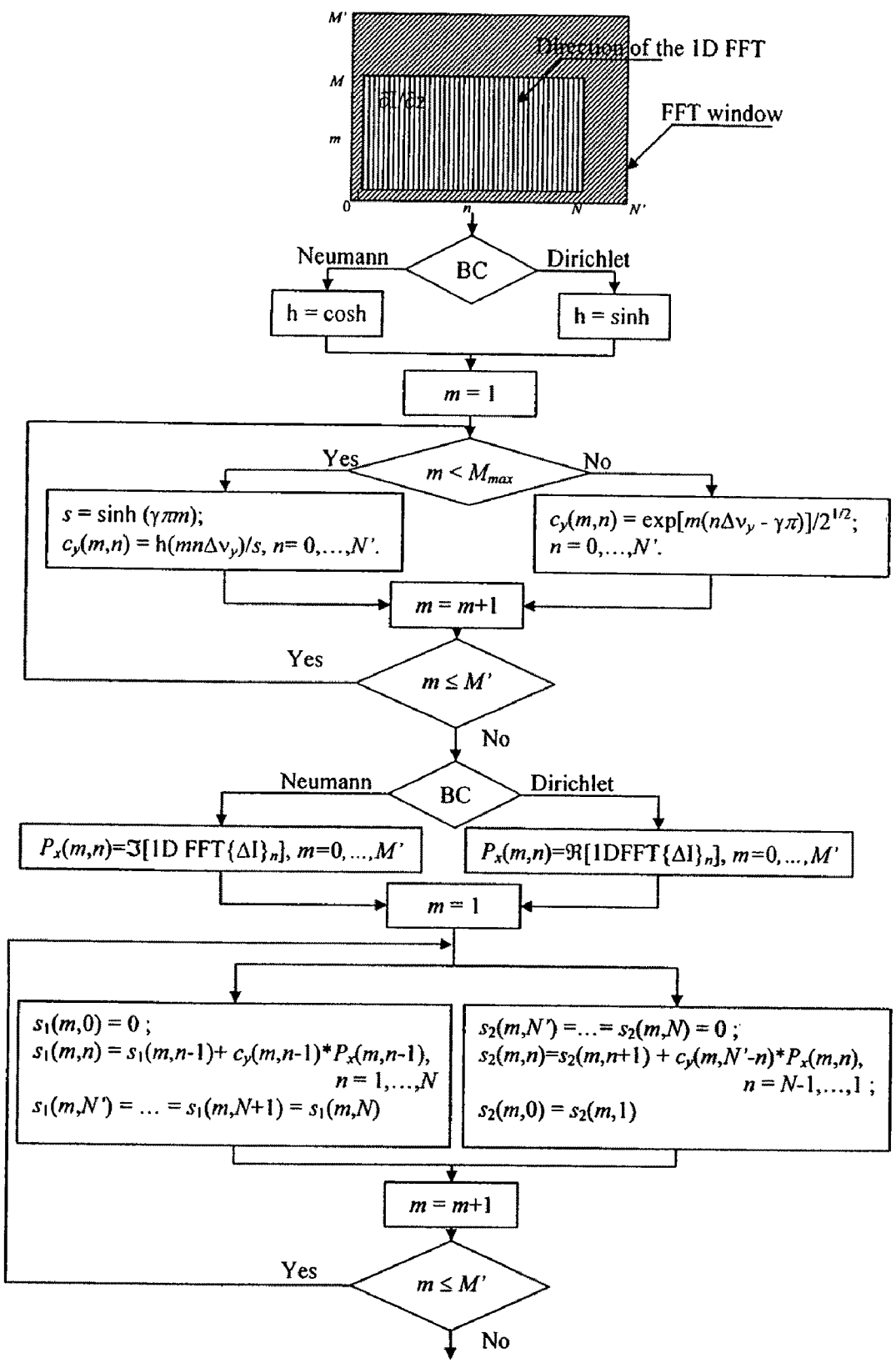
FIGS. 5A, 5B and 5C, which should be read in a successive manner, represent one exemplary implementation mode.
Figure 5B:
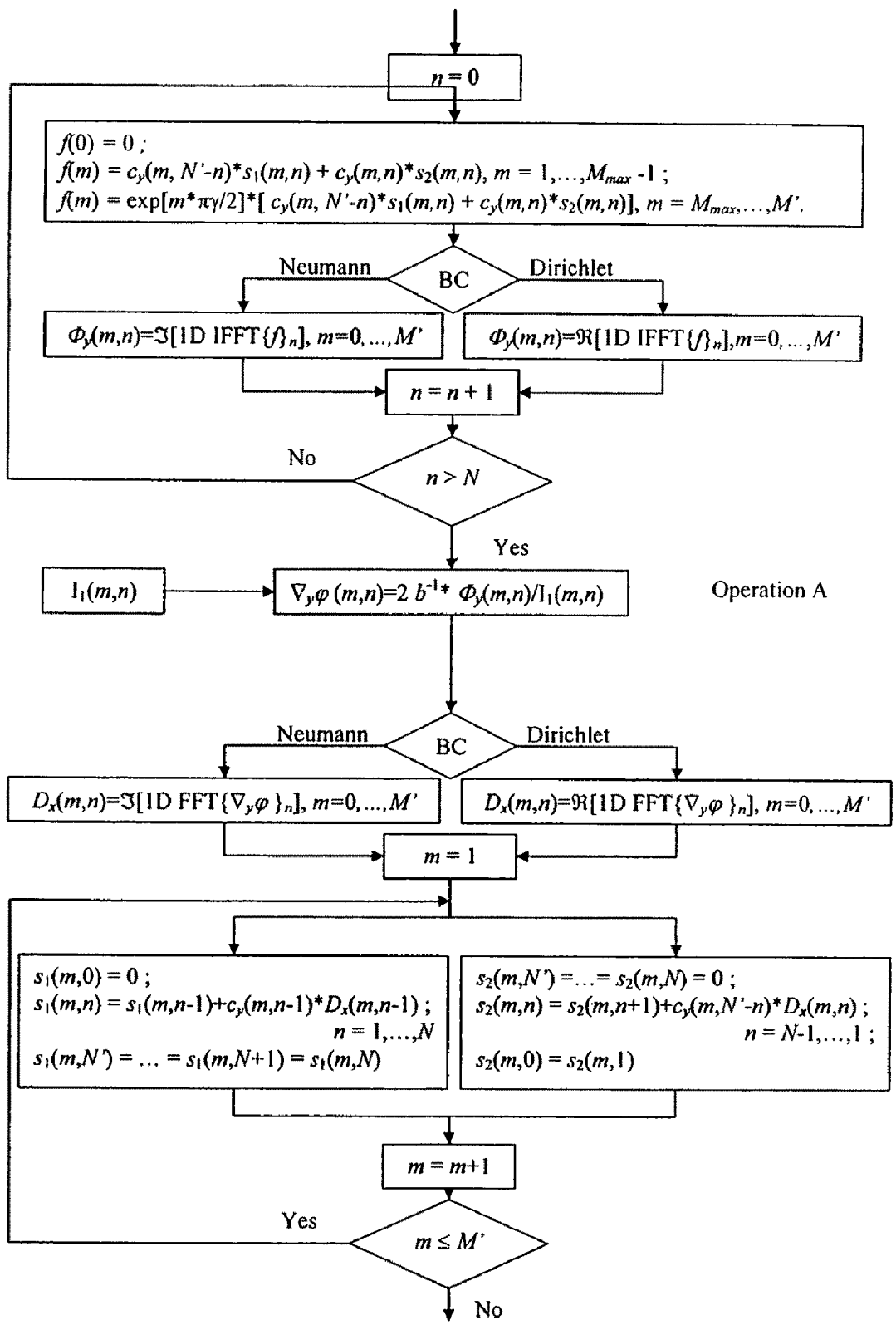
Figure 5C:
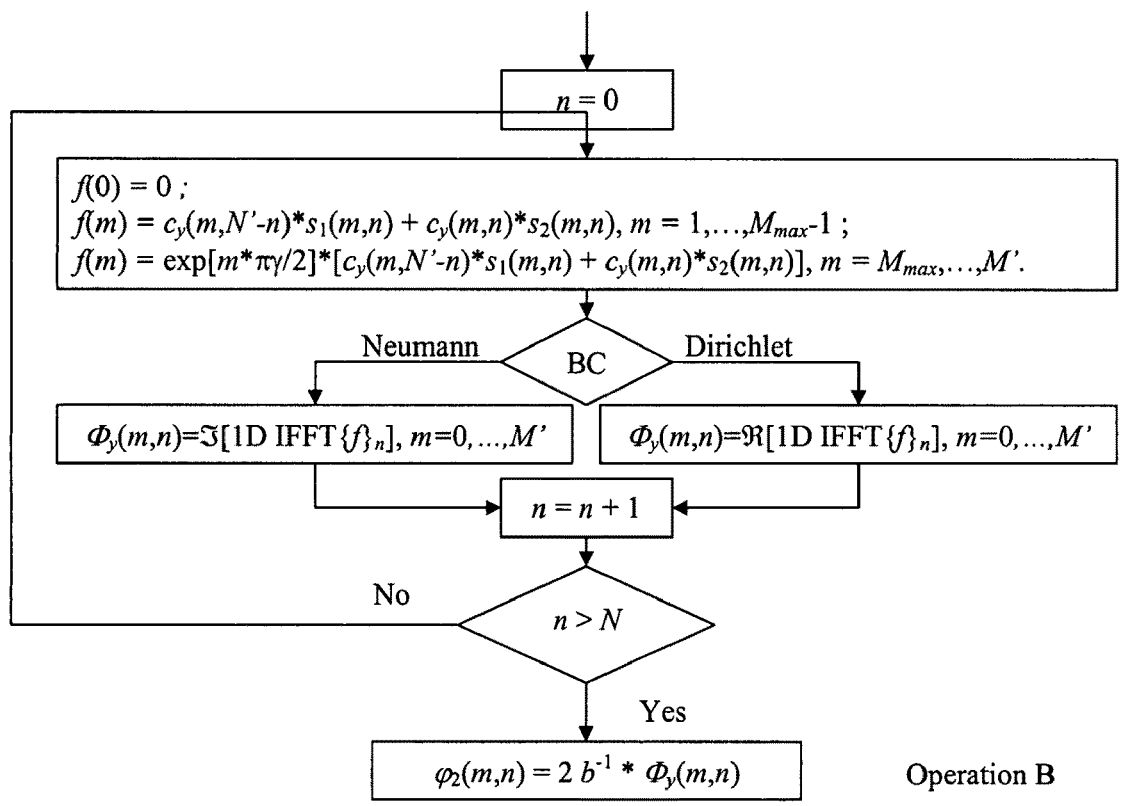

FIGS. 5a, 5b and 5c show an implementation of the equations described above. It is also noted that the discrete nature of the real data in the images (values in x and y being obtained from pixel data), allows a discrete calculation of the integrals given in the equations and an formulation of calculations in the form of finite discrete sums. The modes of calculations of these discrete sums are given in the algorithm as an example and can of course vary according to choices without limiting the scope of the appended claims.

Illustrated in FIG. 5a, the oblique hatchings of the initial image denote the FFT window used for calculations. This window exceeds the useful image and can be filled by 0, according to the known method of the "zero padding", or "zero-filling", or by any other well known method in the field of the image processing.

The vertical lines of FIG. 1 indicate the direction of the 1D FFT in this illustrated part of the algorithm. In this mode of implementation, the FFT is calculated by fixing a column while varying the row index.

In addition, it can be noted from FIG. 5a the introduction of the parameter $M_{max}$ used preferably according to this implementation mode to avoid divergence of the terms in hyperbolic sine and a specific calculation of the coefficient $c_y(m,n)$ if the index representing the coordinates exceeds this threshold value.

One will recognize, by Operation A, obtaining the phase derivative with respect to y as described in the first part of Equation 30. It is noted that Operation A requires the operation of division by a measure of intensity which can make the solution diverge if this intensity is zero. In this case, it is possible to carry out a determination of the zeros of the intensity beforehand to correct the divergence and/or to assign a minimum value to the intensity in the event of zero intensity in a considered point of space.

According to Equation 22, the method of calculation applies a 1D Fourier transform to the phase gradient with respect to y to obtain the first part of the phase as in Equation 21. This first term $\phi_2(m, n)$ is obtained as a result of the Operation B of FIG. 5c.

In the same manner (not shown), the phase derivative with respect to x is obtained as described in the first part of Equation 30, and according to Equation 23, one applies then the method of calculation using the 1D Fourier transform applied to the phase gradient with respect to x to obtain the second part of the phase $\phi_1(m, n)$, as in Equation 21.

The reconstructed phase is computed by $\phi(m, n)=\phi_1(m, n)+\phi_2(m, n)$.

In a general way, illustrated in FIGS. 5A, 5B and 5C, the algorithm thus comprises, after the calculation of a measure of intensity variation on a surface ($\partial I/\partial z$ in the illustrated realization mode), the application of a first integral transformation, preferably in the form of a Fast Fourier Transform, to obtain the variable named $r_x(m, n)$ depending on the used boundary conditions. This variable is then multiplied (in the Fourier space or, more generally, in the projection space) by a filter corresponding to the functions $f_n^{\bar{\gamma}}$ and $f_m^{\gamma}$, possibly modified by the calculation constraints of the type $M_{max}$.

In accordance with Equations 19 and 20, these filters $f_n^{\bar{\gamma}}$ and $f_m^{\gamma}$ are representations of a Green's function in a space of eigenfunctions of the Helmholtz equation, for example the functions associated with Equations 5 and 6.

Inverse integral transforms are then applied, for example, Inverse Fourier Transforms, by taking the real or imaginary parts according to boundary conditions.

For example, as Equation 26 indicates, the division by a measure of intensity, for example, that taken on a computation plane of the intensity variation, makes it possible to obtain the gradient of the phase with respect to one of the coordinates.

In conformity with Equations 21, 22, and 23, a one-dimensional integral transform, for example, of Fourier type, is then applied, a second filter to the obtained variable [$D_x(m, n)$ in the proposed realization mode] is applied, and an inverse integral transform is applied, to obtain substantially one of the terms of the expression defining the required phase.

It is understood that using the example of implementation of the algorithm given in the figures and described above, it is to make modifications of implementation, for example, according to computation power of the used computers or according to specific characteristics of the image.

Regarding the description made above of the equations necessary for the implementation of the algorithm and of the processing algorithm itself, it will be understood that the described realization mode is only a non-restrictive example.

In particular, in the case of a nonrectangular support, it is possible to determine the eigenfunctions of the Helmholtz equation for a special form of support. As an indication only, the form of these functions in case of a circular support is given by:

$$U_{m,n}(\rho,\phi)=[\cos(m\phi)+\sin(m\phi)]J_m(\pi\alpha_{mn}\rho/a), \quad m, n=0, \ldots, \infty \quad \text{Equation 5}$$

where $J_m$ is the Bessel function or order m with $J'_m(\pi\alpha_{mn})=0$, m, n=0, ..., ∞, i.e. $\pi\alpha_{mn}$ is the n-th zero of the derivative of Bessel function of order m. Equation 8 allows then to obtain the associated Green's function.

The use of the Green's function associated with this eigenfunction is particularly useful if the phase reconstruction in a circular area gives the sufficient information about the topography of the object of circular geometry, such as for example in case of visualization and measurement of the front face of an optical fiber.

One skilled in the art will be able to determine these eigenfunctions in the case of triangular or semi-infinite supports.

In addition, I describe an implementation mode utilizing one-dimensional discrete Fourier transforms, but one skilled in the art will be able to implement one-dimensional discrete Bessel transforms, as a curvilinear analogue of the Fourier transforms. It is also possible to use any type of integral transformation as a projection of a function on a function space, for example, determined by the type of function used in equations 5 or 5'.

In any case, if the eigenfunctions of Helmholtz equation are expressed in separable coordinates, in particular if the support of the image is not distorted too much, my methods can be used and integral transformations can be carried out in only one dimension.

For very distorted supports, conformal mapping transforms can be used to reduce these supports to simpler supports, or to define this support as a composition of simpler supports.

Moreover, it is understood that the implementation mode described for an image is also applicable for any type of radiation wave field in the whole luminous spectrum. To apply my methods at the various spectra, it is possible to modify the acquisition setups as described in the following section devoted to the setups associated with the invention.

includes also a movable platform 76 to which elements 71, 72 and 73 are attached. This platform is set in motion by a displacement system 77 in form of, for example, a motor or a piezoelectric element.

Figure 8:
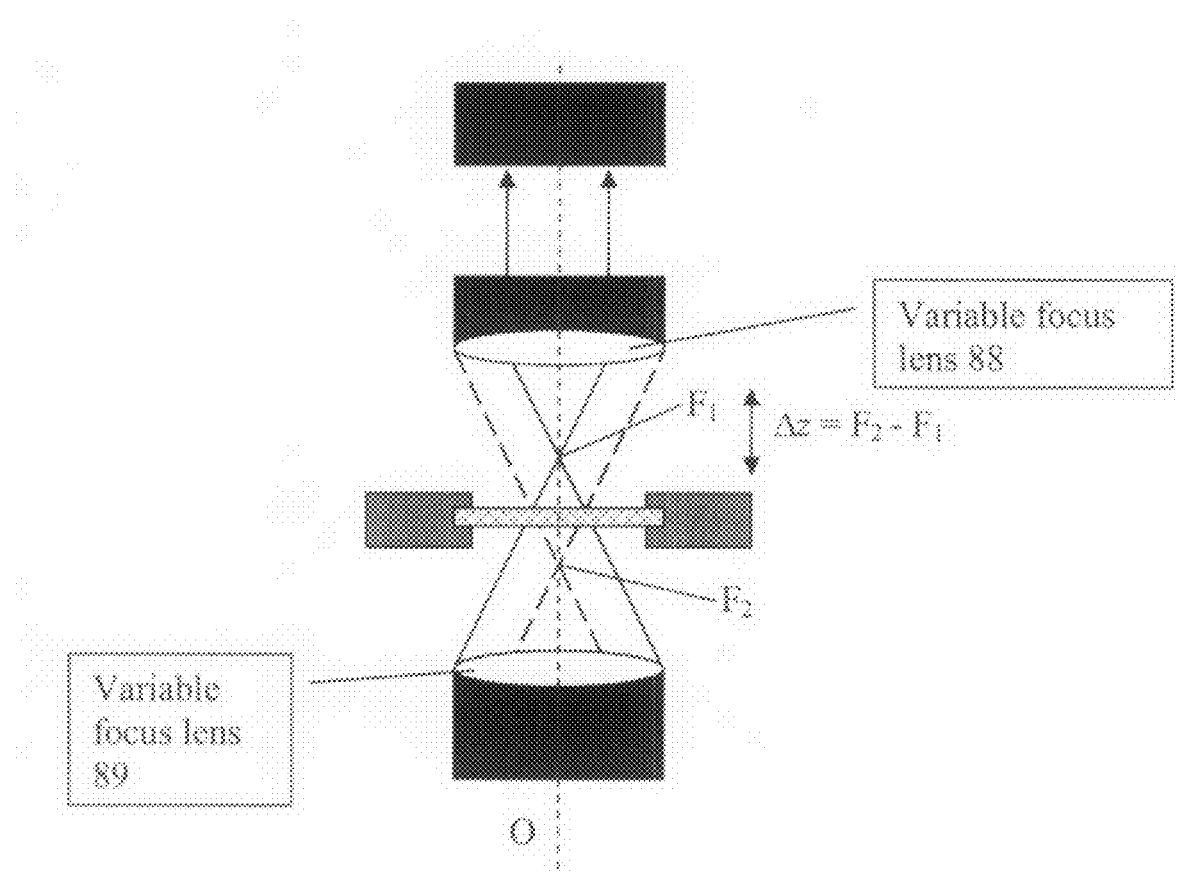

As shown in FIG. 8, I include a measurement device using one or more lenses with variable focal distances. In this case, a lens with a variable focal distance 88 is placed for example at the position of the projection system and, according to an alternative, a lens with variable focal distance 89 is placed at the position of the illumination system for measurements of a fixed transparent sample. In this case, the displacement in intensity measurements corresponds to the difference in focal distances, $\Delta z = F_2 - F_1$. In case of two lenses, the modifications of the focal distances will be done simultaneously for the two lenses. This system is also realizable with only one lens with a variable focal distance.

Figure 9:
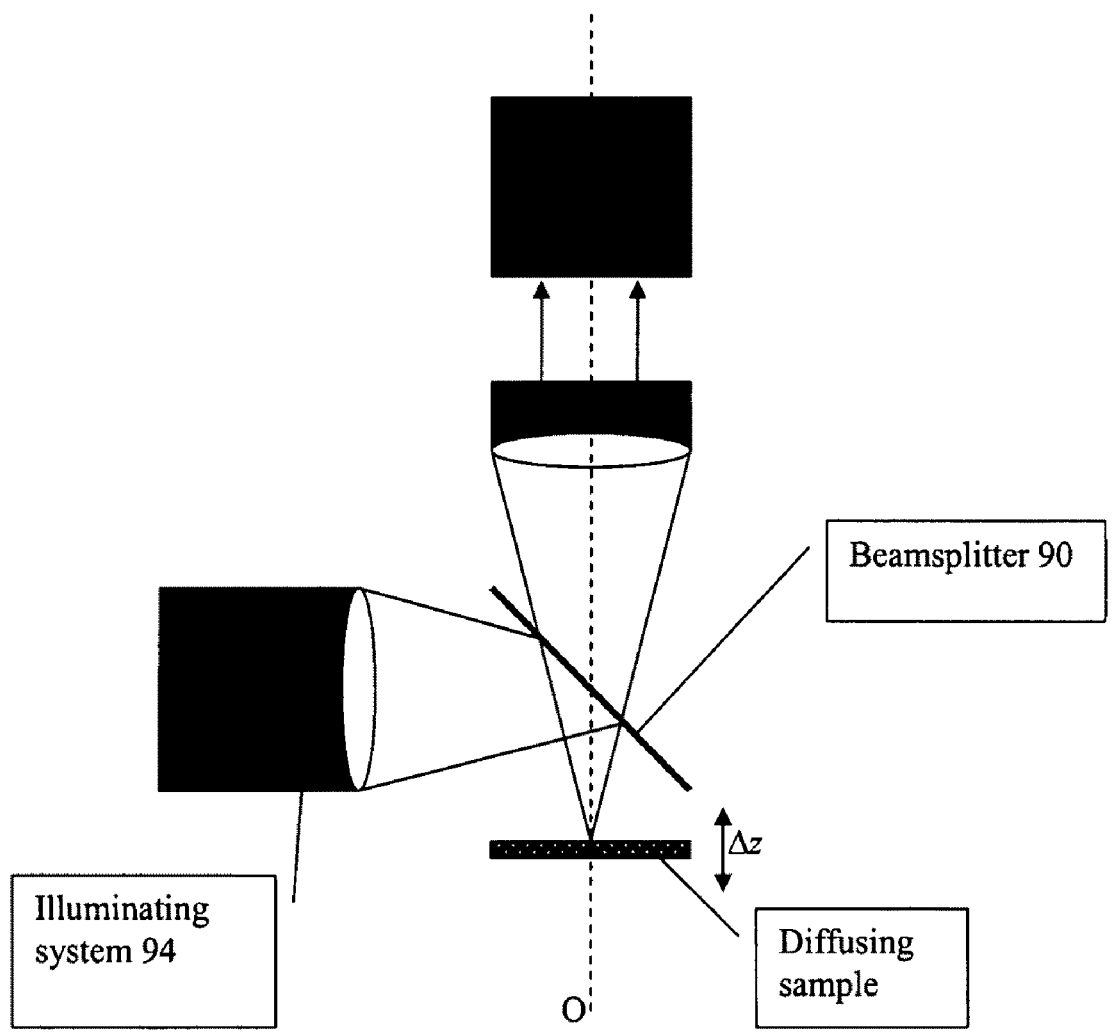

As shown in FIG. 9, for the diffusing and non-transparent sample, one can use a beam splitter 90 intended to direct a luminous beam coming from the illuminating system 94. One can then use the set of the elements previously described such as the sensor, the projection system, the whole unit being either fixed or mobile, as well as one or more lenses with variable focal distances, as previously described.

The image sensor is connected to an image processing device including a software for the implementation of the algorithm.

The images of phase obtained by this software can then be visualized on a computer screen.

TABLE I

| Term in the continuous notation | Description of the term in the continuous notation | Relation to the discrete notation | Relation to the geometry of a CCD type sensor |
|---|---|---|---|
| $\vec{r} = (x, y)$ and $\vec{r}' = (x', y')$ | Vectors from the origin to the points in the two-dimensional space | Grid of points with coordinates (m, n) for each integer number m and n. | Coordinates of the centre of an element on the CCD sensor |
| S | Support region for the phase | Grid of points with coordinates (m, n) where $m = 1, \ldots, M$ and $n = 1, \ldots, N$. | All the active elements of the sensor |
| x = a | Boundary line to the phase support region S, in the y direction | The column of the grid with the column index $n = N + 1$ | The column of the passive elements of the sensor situated to the right of all the active elements of the sensor. |
| y = b | Boundary line to the phase support region S, in the x direction | The row of the grid with the row index $m = M + 1$ | The row of the passive elements of the sensor situated beneath all the active elements of the sensor |
| C | Boundary to the phase support region S | Two rows of the grid of points with coordinates (0, n) and (M + 1, n) where $n = 1, \ldots, N$, as well as two columns with coordinates (m, 0) and (m, N + 1) where $m = 1, \ldots, M$ | All the passive elements of the sensor (or its boundary) that enclose the rectangular area of active pixels |

Measurement Setups

In accordance with the example in FIG. 4, it is advisable to use devices of measurement of the intensity in distinct planes. These measurements are carried out in planes perpendicular to the optical axis.

Figure 6:
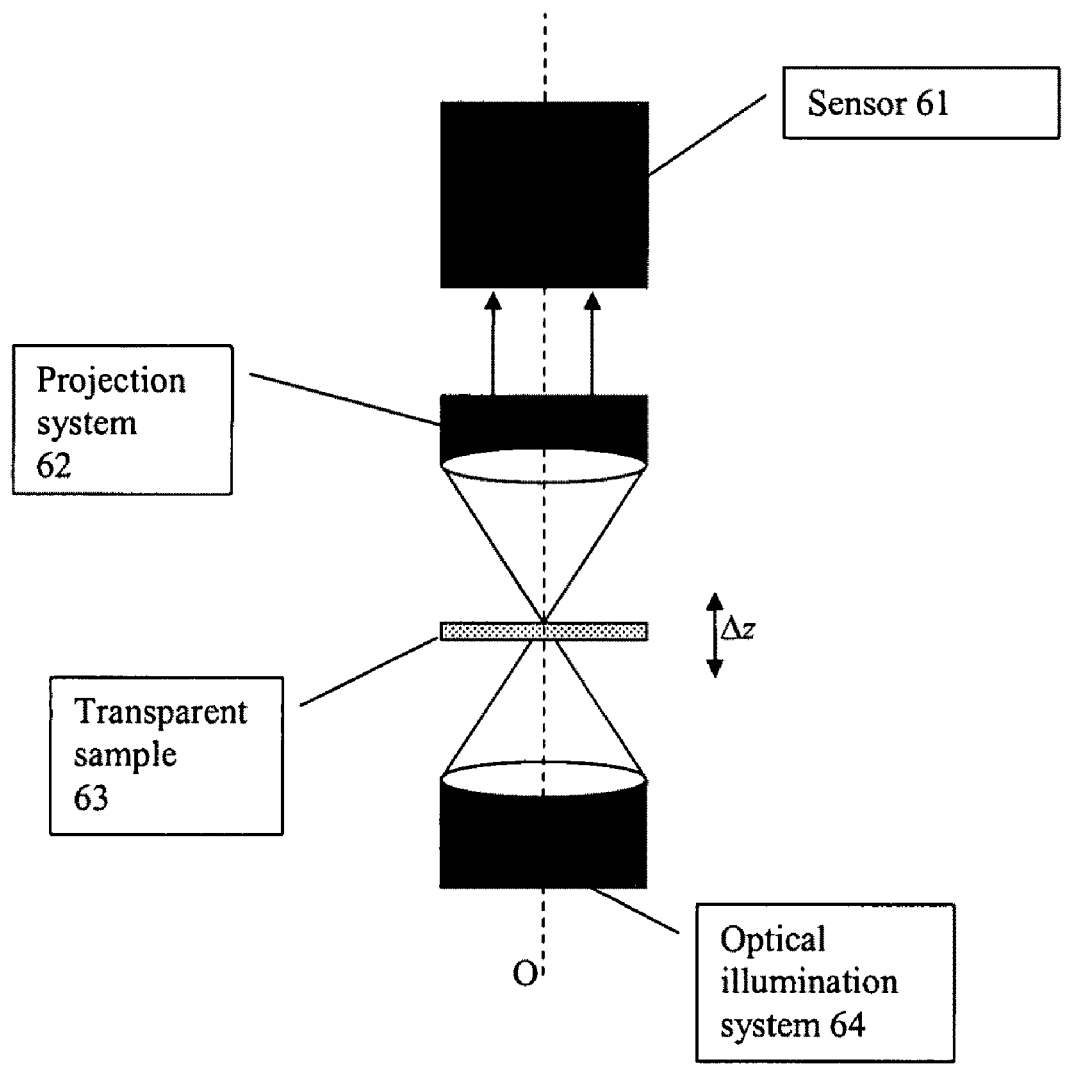
FIGS. 6-9 represent devices for implementation of my methods.

To do this, as illustrated in FIG. 6, the acquisition of an image of a transparent sample is carried out. Measurements can be taken on the two perpendicular planes, the position of the sample can be modified compared to a fixed optical device or to move the optical device.

In FIG. 6, for a transparent sample, the device comprises an image sensor 61, for example, in form of a CCD sensor, an optical projection system 62 to project the light coming from sample 63 towards the sensor. The light is emitted by an optical illuminating system 64. The sample is mobile along the Z axis due to a displacement device (not shown).

Figure 7:
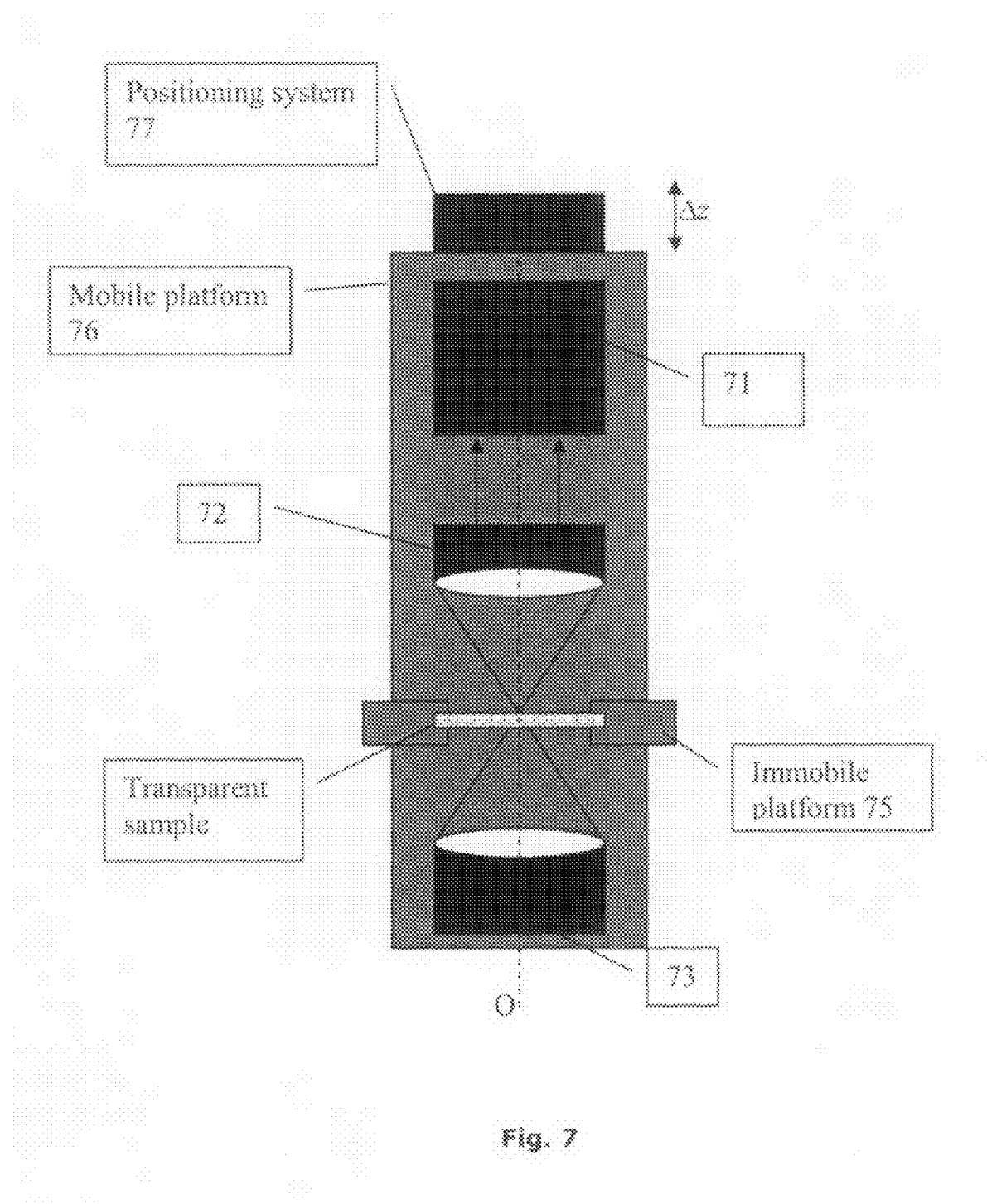

As shown in FIG. 7, the sample is fixed at a motionless platform 75. The optical device still includes a sensor 71, a projection system 72 and an illumination system 73, and it

The invention claimed is:

1. A method of reconstructing a phase of a radiation wave field comprising:

determining a representative measure of an intensity variation of the radiation wave field on a selected surface extending globally from one end to another of the radiation wave field;

determining a representative measure of the intensity of the radiation wave field on the selected surface;

transforming the representative measure of the intensity variation to produce a first representation of integral transform and to apply to the first representation of integral transform a first filter and producing a first representation of modified integral transform;

applying a first function of the first representation of integral transform to the first representation of modified integral transform and producing an untransformed representation;

applying a correction based on the measure of intensity on the selected surface to the untransformed representation;

transforming the untransformed corrected representation to produce a second representation of integral transform and applying a second filter to the second representation of integral transform; and applying a second function of the second integral transform to the second modified representation of integral transform to produce a measure of phase of the radiation wave field on the selected surface extending globally from one end to another of the radiation wave field, wherein the first and second filters are measures of a representation of a Green's function in a space of eigenfunctions of the Helmholtz equation with separable coordinates such that the first and second integral transforms are one-dimensional integral transforms in the space of the radiation wave field.

2. The method according to claim 1, wherein the first and second integral transforms are produced by using a Fourier transform.

3. The method according to claim 2, wherein the Fourier transform is a fast Fourier transform.

4. The method according to claim 1, wherein the first function uses a trigonometric function of the cosine type, and the second function uses a trigonometric function of the sine type.

5. The method according to claim 1, wherein the first function uses a trigonometric function of the sine type, and the second function uses a trigonometric function of the cosine type.

6. The method according to claim 1, wherein the first and second filters are substantially the same.

7. The method according to claim 1, wherein the surfaces are sensibly planar.

8. A computer program stored on a non-transitory computer readable medium that carries out the steps according to claim 1.

9. A computer program stored on a non-transitory computer readable medium readable by a computer, including a means to carry out the steps according to claim 1.

10. An apparatus for reconstructing a phase of a radiation wave field comprising:

a means for acquisition of a representative measure of an intensity variation of the radiation wave field on a selected surface extending globally from one end to another of the radiation wave field;

a means for acquisition of a representative measure of the intensity of the radiation wave field on the selected surface;

a processor to sequentially perform the following steps:

(i) transform the representative measure of the intensity variation to produce a first representation of integral transform and apply to the first representation of integral transform a first filter and produce a first representation of modified integral transform;

(ii) apply a first function of the first representation of integral transform to the first representation of modified integral transform to produce an untransformed representation;

(iii) apply a correction based on the measure of intensity on the selected surface to the untransformed representation;

(iv) transform the untransformed corrected representation to produce a second representation of integral transform and to apply to the second representation of integral transform a second filter; and (v) apply a second function of the second integral transform to the second modified representation of integral transform to produce a measure of phase of the radiation wave field on the selected surface extending globally from one end to another of the radiation wave field, wherein the first and second filters are measure of a representation of a Green's function in a space of eigenfunctions of the Helmholtz equation with separable coordinates such that the first and second integral transforms are one-dimensional integral transforms in the space of the radiation wave field.

11. The apparatus according to claim 10, wherein the means of acquisition of a representative measure of the intensity variation of the radiation wave field includes at least a mobile platform.

12. The apparatus according to claim 10, wherein the means of acquisition of a representative measure of the intensity variation of the radiation wave field includes at least a lens of variable focal distance.

* * * * *